US012730228B2

(12) United States Patent
Pyke et al.

(10) Patent No.: US 12,730,228 B2
(45) Date of Patent: Sep. 8, 2026

(54) METHODS AND SYSTEMS FOR DETERMINING AND VISUALIZING GNSS AVAILABILITY WITHIN AN OPERATIONAL AREA

(71) Applicant: Caterpillar Inc., Peoria, IL (US)

(72) Inventors: Sandy Pyke, Saint-Constant (CA); Nathan Pugh, Broomfield, CO (US); Jonathan P. Peck, Quebec (CA)

(73) Assignee: Caterpillar Inc., Peoria, IL (US)

( * ) Notice: Subject to any disclaimer, the term of this patent is extended or adjusted under 35 U.S.C. 154(b) by 232 days.

(21) Appl. No.: 18/422,640

(22) Filed: Jan. 25, 2024

(65) Prior Publication Data

US 2025/0244485 A1 Jul. 31, 2025

(51) Int. Cl.
*G01S 19/27* (2010.01)
*G01S 19/14* (2010.01)

(52) U.S. Cl.
CPC .............. *G01S 19/27* (2013.01); *G01S 19/14* (2013.01)

(58) Field of Classification Search
CPC ................................ G01S 19/27; G01S 19/14
See application file for complete search history.

(56) References Cited

U.S. PATENT DOCUMENTS 7,511,662 B2 3/2009 Mathews et al.
8,018,376 B2 9/2011 McClure et al.
9,360,321 B2 6/2016 Haglund et al.
9,945,956 B2 4/2018 Chhokra et al.
10,187,806 B2 1/2019 Priest
2009/0112510 A1* 4/2009 Crane .................... G01B 21/18 702/174
2013/0138338 A1* 5/2013 Behara .................... G01S 19/20 701/458
2016/0238711 A1* 8/2016 Matthews ............... G01S 19/24
2016/0280401 A1* 9/2016 Driscoll ................. G01S 5/011
2016/0292920 A1 10/2016 Sprock et al.
2019/0011571 A1 1/2019 Driscoll et al.
(Continued)

FOREIGN PATENT DOCUMENTS

CN 117242713 A 12/2023
KR 101412515 B1 7/2014
WO 2020089438 A1 5/2020

OTHER PUBLICATIONS

Guohao Zhang et at., Prediction on the Urban GNSS Measurement Uncertainty Based on Deep Learning Networks With Long Short-Term Memory, IEEE Sensors Journal, vol. 21, No. 18, pp. 20563-20577, Sep. 15, 2021.
(Continued)

*Primary Examiner* — William Kelleher
*Assistant Examiner* — Hailey R Le

(57) ABSTRACT

In one instance, disclosed herein is a method for providing a GNSS future coverage map, the method comprising: receiving worksite geography data associated with a worksite and satellite ephemeris data associated with a future time period; determining, based at least in part on the worksite geography data and the satellite ephemeris data associated with the future time period, GNSS coverage of the worksite throughout the future time period; generating a future coverage map representing the GNSS coverage of the worksite throughout the future time period; and causing a graphical user interface (GUI) to display the future coverage map.

20 Claims, 4 Drawing Sheets

(56) References Cited

U.S. PATENT DOCUMENTS

| | | | | |
|---|---|---|---|---|
| 2021/0263164 | A1* | 8/2021 | Gunning | G01S 19/07 |
| 2022/0018972 | A1* | 1/2022 | Bennington | G05D 1/101 |
| 2022/0050211 | A1* | 2/2022 | Bennington | G01S 19/06 |
| 2023/0134701 | A1 | 5/2023 | Åström et al. | |
| 2024/0324044 | A1* | 9/2024 | Abad | H04W 36/32 |

OTHER PUBLICATIONS

Written Opinion and International Search Report for Int'l. Patent Appln. No. PCT/US2024/060895, mailed Apr. 17, 2025 (10 pgs).

* cited by examiner

METHODS AND SYSTEMS FOR DETERMINING AND VISUALIZING GNSS AVAILABILITY WITHIN AN OPERATIONAL AREA

TECHNICAL FIELD

The present disclosure relates generally to global navigation satellite systems (GNSS), and, more particularly, to methods and systems for accurately determining and visualizing GNSS availability within an operational area.

BACKGROUND

A Global Navigation Satellite System (GNSS) refers generally to a constellation of satellites that provide signals including positioning and timing data from space down to GNSS receivers on or around the earth. A GNSS receiver can use positioning and timing data received from a plurality of satellites included in one or more constellations of satellites to determine a relative location of the GNSS receiver, through a computational method referred to as trilateration. For example, Global Positioning System (GPS) is a particular GNSS developed by the United States; however, a multitude of other GNSSs exist, including Russia's GLONASS, Europe's Galileo system, China's BeiDou system, Japan's QNSS, and India's NavIC system, and additional GNSSs may be established in the future. Many systems rely on one or more GNSSs for positioning and navigation.

The availability and accuracy of a GNSS for a GNSS receiver positioned at a particular location is generally determined by the number of satellites included in the GNSS and concurrently available for the GNSS receiver, as well as the geometric relationships of those satellites to the GNSS receiver. Accordingly, with knowledge of the orbits of the satellites included in a particular GNSS, which are generally accessible, quantifiable, and reliable, it is possible to estimate the availability and accuracy of the GNSS for a GNSS receiver positioned at a particular location at a particular moment in time. However, the actual availability and accuracy of a GNSS for a GNSS receiver positioned at a particular location may be impacted by various factors, such as the elevation of the GNSS receiver and/or geographic or manmade features located near the location of the GNSS receiver. Thus, the actual availability and accuracy of a GNSS for a GNSS receiver may differ considerably from an estimated availability and accuracy of the GNSS for the GNSS receiver, if these factors are not adequately accounted for.

U.S. Pat. No. 9,945,956, issued to Chhokra et al. on Apr. 17, 2018 ("the '956 patent"), describes a method for determining an uncertainty bound for an estimated position of a mobile device received by a GNSS receiver, based on geographic features located near the estimated position. However, the '956 patent does not address, among other things, visualizing a predicted availability and accuracy of a GNSS for a GNSS receiver positioned at a particular location throughout a future time period.

The systems and methods of the present disclosure may solve one or more problems set forth above and/or other problems in the art. The scope of the protection provided by the present disclosure, however, is defined by the attached claims, and not by the ability to solve any specific problem.

SUMMARY

In one aspect, a method for providing a GNSS future coverage map comprises: receiving worksite geography data associated with a worksite and satellite ephemeris data associated with a future time period; determining, based at least in part on the worksite geography data and the satellite ephemeris data associated with the future time period, GNSS coverage of the worksite throughout the future time period; generating a future coverage map representing the GNSS coverage of the worksite throughout the future time period; and causing a graphical user interface (GUI) to display the future coverage map.

In another aspect, a method for providing a GNSS future coverage map comprises: receiving worksite geography data associated with a worksite and satellite ephemeris data associated with a future time period; determining, based at least in part on the worksite geography data and the satellite ephemeris data associated with the future time period, GNSS coverage of the worksite throughout the future time period; determining, based at least in part on ground-truth GNSS data associated with the worksite, an elevation offset associated with the worksite; generating, based at least in part on the GNSS coverage of the worksite throughout the future time period and the elevation offset associated with the worksite, a future coverage map representing the GNSS coverage of the worksite throughout the future time period; and causing a graphical user interface (GUI) to display the future coverage map.

In another aspect, a system for providing a GNSS future coverage map comprises at least one processor operative to: receive worksite geography data associated with a worksite and satellite ephemeris data associated with a future time period; determine, based at least in part on the worksite geography data and the satellite ephemeris data associated with the future time period, GNSS coverage of the worksite throughout the future time period; generate a future coverage map representing the GNSS coverage of the worksite throughout the future time period; and cause a graphical user interface (GUI) to display the future coverage map.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, “about,” “substantially,” and “approximately” are used to indicate a possible variation of ±10% in the stated value.

Figure 1:
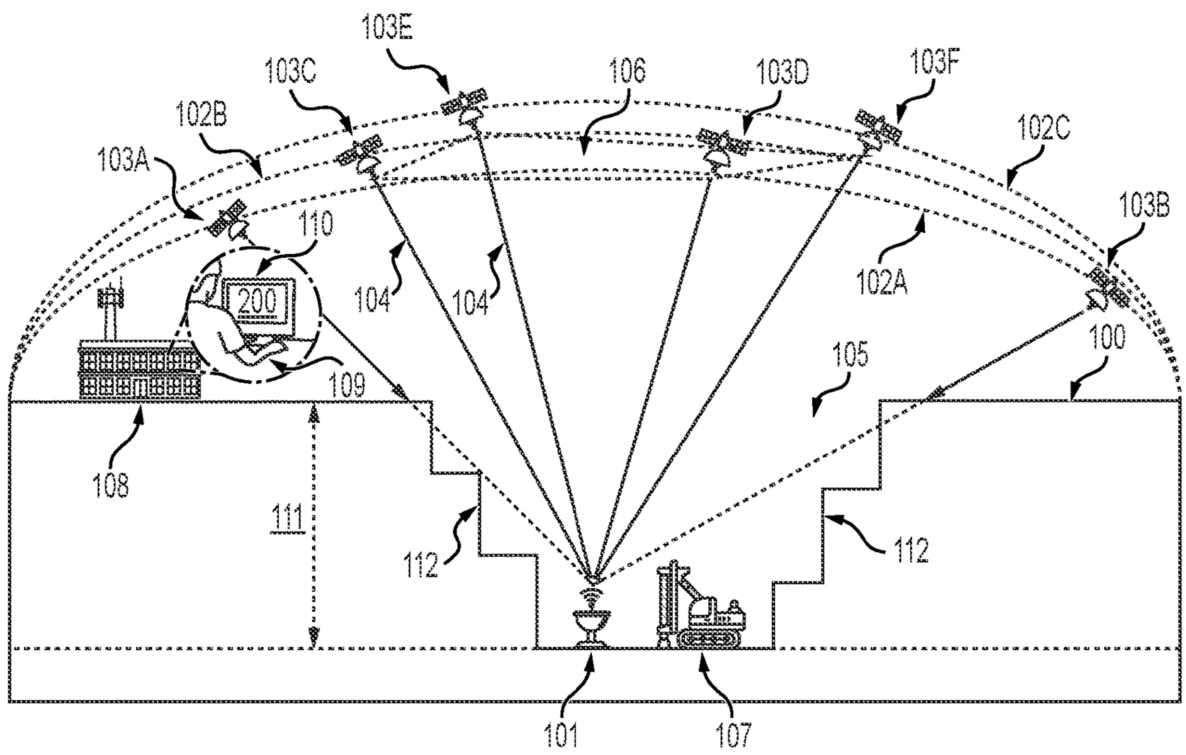
FIG. 1 illustrates a schematic view of GNSS constellations in relation to a worksite.

FIG. 1 illustrates a schematic view of GNSS constellations in relation to a worksite. As mentioned above, a GNSS includes a constellation of satellites. For example, GPS includes a constellation of 31 satellites, GLONASS includes a constellation of 24 satellites, the Galileo system includes a constellation of 26 satellites, and the BeiDou system includes a constellation of 46 satellites. A constellation of satellites included in a GNSS may be referred to as a GNSS constellation. The number of satellites included in a GNSS constellation may increase or decrease over time. A GNSS receiver may be any device or system operative to receive signals from one or more GNSS constellations. For example, in some instances, a GNSS receiver may be a “hardware GNSS receiver,” composed of physical and digital components designed specifically for the purpose of being a GNSS receiver. Or for example, in some instances, a GNSS receiver may be a “software GNSS receiver,” composed of a general purpose processor that has been configured to execute a program or an application operative to analyze signals received from a GNSS. Positioned at any given location on or around the earth, a GNSS receiver may be able to receive signals from one or more satellites included in one or more GNSS constellations, depending on various factors, such as the specific GNSSs that the GNSS receiver is configured to receive signals from and the geometric relationships of the satellites included in those GNSSs to the location and position of the GNSS receiver. A satellite from which a GNSS receiver is able to receive signals may be referred to as “visible” to the GNSS receiver or available for the GNSS receiver. Using signals received from one or more satellites available for a GNSS receiver, the GNSS receiver may be able to determine its location, or its position relative to other locations. In addition to determining its location or position, a GNSS receiver may be able to determine how many satellites are available for the GNSS receiver, and the dilution of position (DOP) value of those satellites, as described below.

In the example illustrated in FIG. 1, a GNSS receiver 101 has been positioned at a location within a worksite 100. As used herein, a worksite 100 is an area including multiple locations at which machinery may be operated. In this example, the worksite 100 is an open-pit mine. However, a worksite 100 may be any other suitable area, such as a forest, a mountain range, or an urban construction zone. In this example, the GNSS receiver 101 is a hardware GNSS receiver that has been positioned at a location at the bottom of the open-pit mine. In this example, the GNSS receiver 101 is configured to receive signals from three different GNSS constellations 102A-102C. For simplicity, each of GNSS constellations 102A-102C includes two satellites and is represented in FIG. 1 by a single arcing orbit, although it should be understood that a GNSS constellation typically includes dozens of satellites, and each satellite included in a GNSS constellation typically has its own individual orbit. For example, GNSS constellation 102A includes satellites 103A and 103B, GNSS constellation 102B includes satellites 103C and 103D, and GNSS constellation 102C includes satellites 103E and 103F.

As a satellite travels through its orbit, there may be some positions along the orbit at which the satellite is visible to a GNSS receiver positioned at a particular location and some positions along the orbit at which the satellite is not visible to the GNSS receiver. As mentioned above, whether a satellite is visible to a GNSS receiver positioned at a particular location may depend on the geometric relationship of the satellite to the location of the GNSS receiver, as well as geographic features located near the GNSS receiver. In the example illustrated in FIG. 1, for simplicity, a satellite is visible to the GNSS receiver 101 if there is an unobstructed line of sight (LOS) 104 from the satellite to the GNSS receiver 101. For example, at their current positions, there is an unobstructed LOS 104 from both satellites 103C and 103D of GNSS constellation 102B to the GNSS receiver 101; thus, both satellites 103C and 103D of GNSS constellation 102B are visible to the GNSS receiver 101. Similarly, both satellites 103E and 103F of GNSS constellation 102C are visible to the GNSS receiver 101 as well. However, at their current positions, the LOS 104 from both satellites 103A and 103B of GNSS constellation 102A to the GNSS receiver 101 are obstructed; thus, neither satellite 103A nor satellite 103B of GNSS constellation 102A is visible to the GNSS receiver 101, given the geographic features located near the GNSS receiver 101. In this example, the geographic or manmade features located near the GNSS receiver that prevent satellites 103A and 103B from being visible to the GNSS receiver 101 include the walls 112 of the open-pit mine. Because of the depth of the open-pit mine, and the steepness of the walls 112 of the open-pit mine, for a satellite to be visible to the GNSS receiver 101, the angle of the LOS 104 from the satellite to the GNSS receiver 101, with respect to the surface 105, must be greater than ~45 degrees (FIG. 1 is not necessarily drawn to scale). The deeper the open-pit mine becomes, or the steeper the walls 112 of the open-pit mine become, the greater the angle between the LOS 104 from a satellite to the GNSS receiver 101 and the surface 105 must be for the satellite to be visible to the GNSS receiver 101. As the satellites 103A-103F of the GNSS constellations 102A-102C travel through their orbits, the angles between their respective LOSs 104 and the surface 105 may wax and wane accordingly.

Thus, in the example illustrated in FIG. 1, although the GNSS receiver 101 is configured to receive signals from all three GNSS constellations 102A-102C, which together include six satellites 103A-103F, at their current positions, and given the geographic features located near the GNSS receiver 101, only four of the satellites (e.g., satellites 103C-103D of GNSS constellation 102B and satellites 103E-103F of GNSS constellation 102C) are visible to the GNSS receiver 101. In general, for a GNSS receiver 101 to determine its position through trilateration, at least four satellites must be visible to the GNSS receiver 101. Thus, in this example, using signals received from the four satellites visible to the GNSS receiver 101, the GNSS receiver 101 is able to determine its position. However, if the GNSS receiver 101 had been configured to receive signals from only GNSS constellations 102A and 102B, or from only GNSS constellations 102A and 102C, the GNSS receiver 101 would not have been able to determine its position.

Having a requisite number of satellites available for a GNSS receiver (e.g., four satellites) allows the GNSS receiver to determine its position, and, generally, the more satellites available for the GNSS receiver, the more accurate the position determined by the GNSS receiver will be. However, the accuracy of the position determined by the GNSS receiver also depends on the geometric relationships of the available satellites to the position of the GNSS receiver. Generally, the more dispersed the satellites available for a GNSS receiver are, the more accurate the position determined by the GNSS receiver will be. This impact on the accuracy of a position determined by a GNSS receiver due to the geometric relationships of satellites visible to the GNSS receiver may be referred to as "dilution of precision" (DOP). For example, as illustrated in FIG. 1, an imaginary rectangular pyramid 106 can be formed from the positions of the four satellites available for the GNSS receiver 101 and their respective LOSs 104. In general, if the volume of this rectangular pyramid 106 were increased, the DOP value would decrease, and the accuracy of the position determined by the GNSS receiver 101 would be improved; if the volume of the rectangular pyramid 106 were decreased, the DOP value would increase, and the accuracy of the position determined by the GNSS receiver 101 would be worsened. Thus, the accuracy of a position determined by a GNSS receiver is a function of the number of satellites available for the GNSS receiver and the geometric relationships of those satellites to the position of the GNSS receiver, e.g., the DOP. Because both the number of satellites available for GNSS receiver 101 and the dispersion of those satellites are adversely affected by the depth of the open-pit mine and the steepness of the walls of the open-pit mine, as the open-pit mine becomes deeper, or as the walls of the open-pit mine become steeper, the more difficult it becomes for a GNSS receiver positioned at the bottom of the open-pit mine to accurately determine its position.

Machines used in open-pit mining are often autonomous or semi-autonomous, and therefore often depend on GNSSs for positioning. For example, an autonomous or semi-autonomous machine 107 used in an open-pit mine, such as a blasthole drill, includes a GNSS receiver and depends on signals from one or more GNSSs to position itself, so as to drill in the correct position, or to avoid colliding with another machine employed by the open-pit mine. A machine drilling in an incorrect position or colliding with another machine could have costly or disastrous consequences for an open-pit mining operation. A machine 107 may also be partially or fully operated by a human operator and still depend on GNSSs for one or more operations. For example, a drilling machine may be fully operated by a human operator but still depend on signals from one or more GNSSs to positional itself, such that the human operator can be sure to drill in the correct location. A machine used in an open-pit mine may also cease functioning if the machine is unable to accurately determine its position for a threshold period of time, e.g., 5 seconds, which may also be costly for an open-pit mining operation. As described above, the deeper an open-pit mine becomes, the more difficult it will become for a machine 107 used in the open-pit mine to accurately determine its position using signals received from one or more GNSSs, and, accordingly, the greater the risk of failure becomes for the open-pit mining operation.

Machines 107 used in an open-pit mine may be managed or operated by one or more mining operators using one or more software systems, which may be executed on one more computing systems 109 at a mining operations center 108. A computing system 109, e.g., at a mining operations center 108, may include a graphical user interface 110, through which the mining operators may access the one or more software systems. In some instances, a GNSS coverage prediction system 200 operative to predict GNSS coverage of a worksite 100, e.g., an open-pit mine, throughout a future time period may be accessed through or executed on a computing system 109 and/or its graphical user interface 110, as described in further detail below. In some instances, the GNSS coverage prediction system 200 is installed and executed on a local computing system, e.g., computing system 109 at the mining operations center 108. In some instances, the GNSS coverage prediction system 200 is provided and executed remotely, for example, on a cloud computing system accessed by a local computing system. Additionally, or alternatively, the GNSS coverage prediction system may be integrated into or otherwise accessed by a mining operations management software system, e.g., a software system used by mining operators to manage mining operations, such as drilling and excavating.

Figure 2:
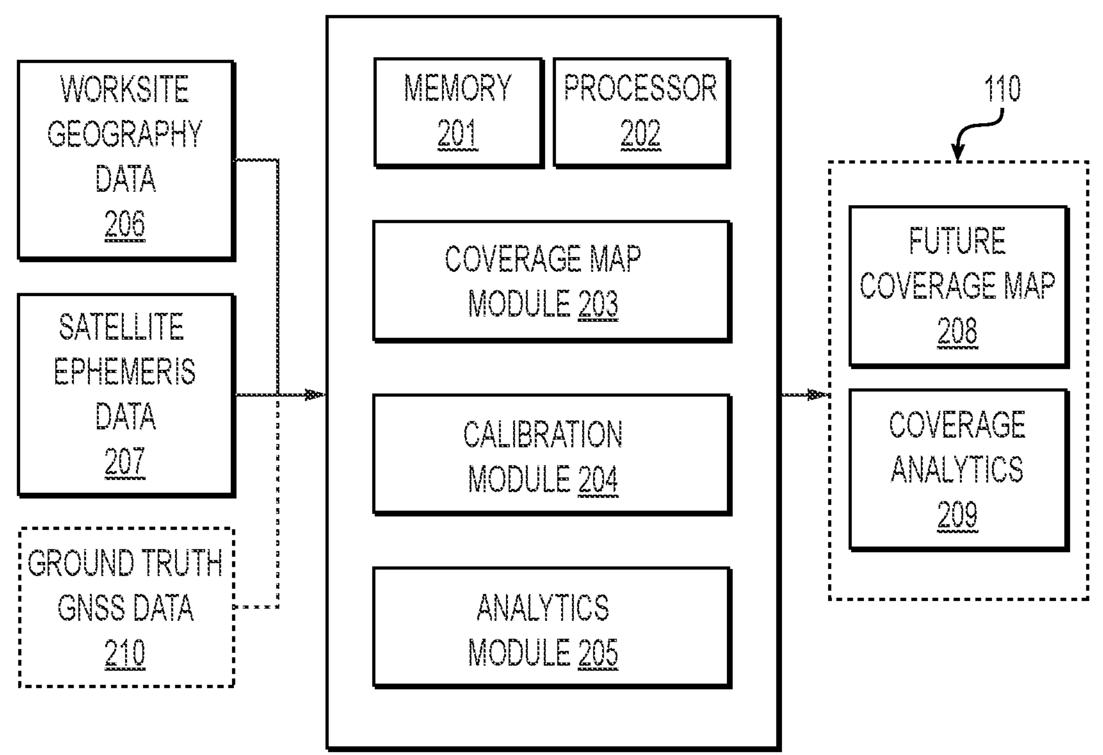
FIG. 2 depicts a schematic diagram of a GNSS coverage prediction system.

FIG. 2 depicts a diagram of a GNSS coverage prediction system 200. As depicted in FIG. 2, a GNSS coverage prediction system 200 (hereinafter, "coverage prediction system" or "CPS") may include one or more computer-readable memories 201 for storing data and computer-executable instructions and one or more processors 202 for accessing the data and executing the computer-executable instructions to provide one or more modules, such as a coverage map module 203, a calibration module 204, and an analytics module 205. In general, the modules of the GNSS coverage prediction system 200 function cooperatively to receive worksite geography data 206, receive satellite ephemeris data 207, and generate and output a future coverage map 208 representing predicted GNSS coverage of a worksite 100 throughout a future time period. In some instances, a future coverage map 208 may be calibrated using ground-truth GNSS data 206. In some instances, a future coverage map 208 may be analyzed to generate and output coverage analytics 209. After generating and outputting a future coverage map 208 or coverage analytics 209, the CPS 200 may prompt a graphical user interface (GUI) 110 to display the future coverage map 208 or coverage analytics 209.

Worksite geography data 206 may include any information describing geographical features of a worksite 100. For example, worksite geography data 206 may include a topographical map of a worksite 100, a three-dimensional model of a worksite 100, or a point cloud representing the geography of a worksite 100. Satellite ephemeris data 207 may include orbit parameters describing past, present, and/or future (e.g., predicted or assigned) positions of one or more satellites in space. The orbit parameters included in satellite ephemeris data 207 may be provided on regular intervals, e.g., every second or every minute. Satellite ephemeris data 207 may be received or accessed as part of a GNSS almanac, which may include satellite ephemeris data 207 corresponding to every satellite included in a GNSS, or to every satellite included in every GNSS. In addition to orbit parameters, satellite ephemeris data 207 may also include "health" information regarding one or more satellites included in a GNSS, e.g., whether a satellite is online, offline, or functioning properly. Ground-truth GNSS data 210 may include data collected or generated by a GNSS receiver 101 of known location, e.g., a number of satellites visible to the GNSS receiver of known location and a DOP value of those visible satellites. Ground-truth GNSS data 210 may be compared to predicted GNSS coverage to calibrate a future coverage map 208, as described in further detail below.

INDUSTRIAL APPLICABILITY

The GNSS coverage prediction system 200 disclosed herein finds applicability in virtually any environment that depends on a GNSS for positioning. For example, the GNSS coverage prediction system 200 can assist mining operators in managing autonomous or semi-autonomous mining machines 107.

Figure 3:
FIG. 3 depicts a flowchart of a method associated with the GNSS coverage prediction system.
Figure 3:
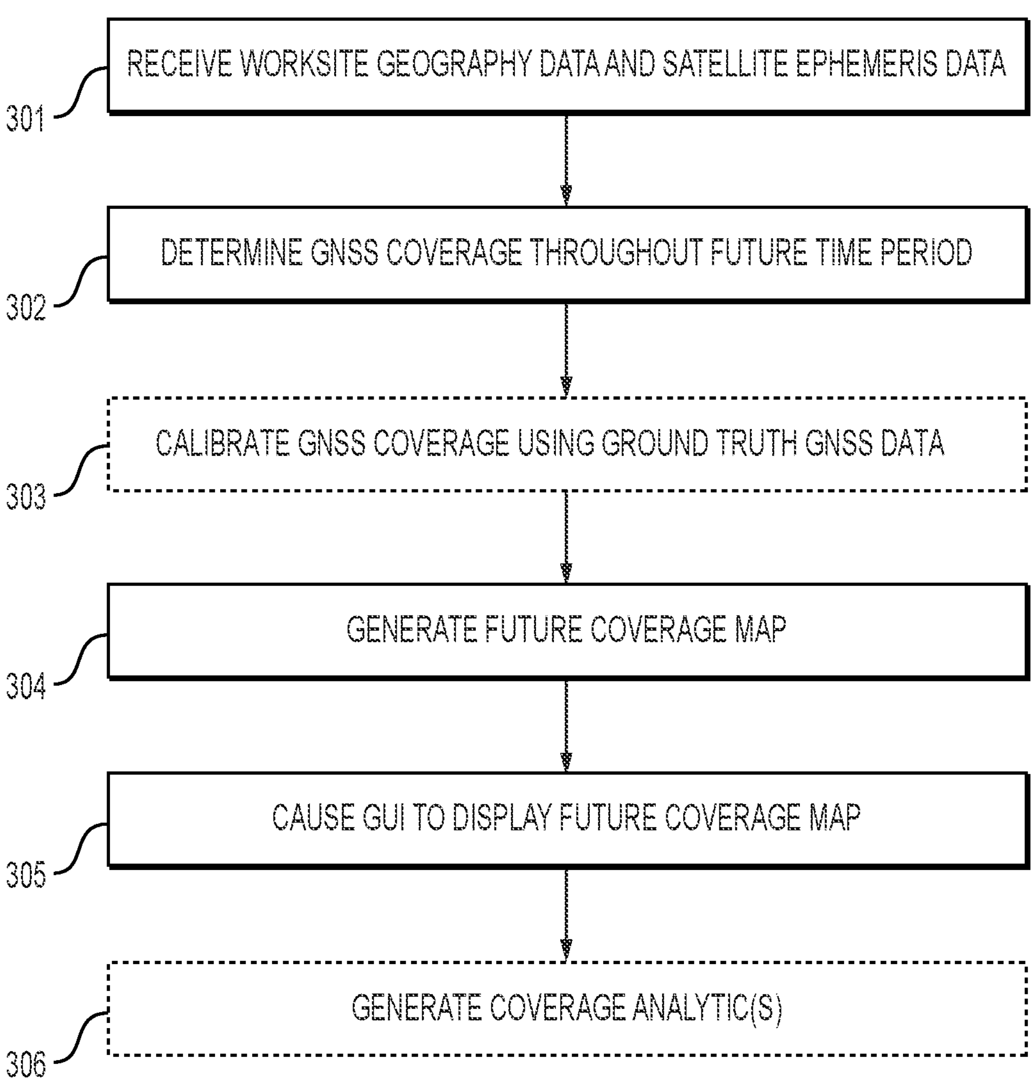

FIG. 3 depicts a flowchart of a method 300 for providing a future coverage map 208 representing predicted GNSS coverage of a worksite 100 throughout a future time period. Although the steps of the method 300 are shown and described in a particular order, it should be understood that the steps of the method 300 may be performed in any suitable order, or simultaneously. In the example depicted in FIG. 3, the method 300 begins with step 301, in which a GNSS coverage prediction system (CPS) 200 receives worksite geography data 206 and satellite ephemeris data 207. Worksite geography data 206 may be received from a software system that employs or otherwise accesses the CPS 200. Satellite ephemeris data 207 may be received or retrieved from one or more private or public databases of satellite ephemeris data 207, or stored in one or more memories 201 of the CPS 200.

Once the CPS 200 has received worksite geography data 206 and satellite ephemeris data 207, the method 300 continues with step 302, in which the CPS 200 uses the worksite geography data 206 and the satellite ephemeris data 207 to generate a future coverage map 208 representing predicted GNSS coverage of a worksite 100 throughout a future time period, such as by employing coverage map module 203. For example, using worksite geography data 206 describing the geographical features of a worksite 100, the CPS 200 can partition the worksite 100 into a virtual matrix of units of area, e.g., square meters. In some instances, before or after the worksite 100 is partitioned into a virtual matrix, the CPS 200 transforms the worksite geography data 206, which may not be oriented according to a standard coordinate system, using site transformation information (e.g., a coordinate conversion formula). Then, for a particular moment in the future, e.g., one hour in the future, the CPS 200 can determine, using the worksite geography data 206 and the satellite ephemeris data 207, a predicted GNSS coverage value for each unit of area included in the virtual matrix. For example, at the particular moment in the future, and for each individual unit of area included in the virtual matrix, the CPS 200 can determine how many satellites would be visible to a theoretical GNSS receiver positioned within the individual unit of area, and what the DOP value of those satellites would be, e.g., based on the geometric relationships of those satellites to the theoretical GNSS receiver. Based on the number of satellites visible to the theoretical GNSS receiver and the DOP value of those visible satellites, the CPS 200 can determine a predicted GNSS coverage value for the individual unit of area.

Predicted GNSS coverage values may range from a minimum value of zero to a maximum value of 100. For example, for an individual unit of area, at a particular moment in the future, if the number of satellites visible to a theoretical GNSS receiver positioned within the individual unit of area would be less than a requisite number of satellites (e.g., four satellites), or if the DOP value of those visible satellites would be greater than 20, then the predicted GNSS coverage value may be zero. Or for example, for the individual unit of area, at the particular moment in the future, if the number of satellites visible to the theoretical GNSS receiver positioned within the individual unit of area would be greater than an ideal number of satellites (e.g., eight satellites), and the DOP value of those visible satellites would be less than 1, then the predicted GNSS coverage value may be 100. If the number of visible satellites is greater than the requisite number of satellites but less than the ideal number of satellites, and if the DOP value of those visible satellites is greater than 1 but less than 20, then the predicted GNSS coverage value may be somewhere between zero and 100, accordingly. However, the CPS 200 may determine a predicted GNSS coverage value in any other suitable way.

Similarly, the CPS 200 can determine predicted GNSS coverage values for each individual unit of area included in a virtual matrix representing a worksite 100 for a series of moments in the future, thereby determining predicted GNSS coverage for the worksite 100 throughout a future time period defined by the series of moments in the future. For example, the CPS 200 may determine predicted GNSS coverage values for each individual unit of area included in a virtual matrix representing a worksite 100 for every five-minute increment of an hour in the future, every one-hour increment of a twenty-four hour day in the future, or every one-day increment of a seven-day week in the future. However, the CPS 200 may determine predicted GNSS coverage of a worksite 100 throughout a future time period in any other suitable way. A future time period may be of any length, e.g., one day or less or one week or more.

In some instances, after the CPS 200 determines predicted GNSS coverage of a worksite 100 throughout a future time period, the method 300 continues with step 303, in which the CPS 200 calibrates the predicted GNSS coverage using ground-truth GNSS data 210, such as by employing the calibration module 204. As mentioned above, actual GNSS coverage may differ from predicted GNSS coverage due to factors such as elevation and geographic features. For example, as illustrated in FIG. 1, predicted GNSS coverage of the worksite 100 for locations at the bottom of the open-pit mine may not adequately account for the depth of the open-pit mine, or the steepness of the walls of the open-pit mine. Accordingly in this example, predicted GNSS coverage values for units of area representing locations at the bottom of the open-pit mine may be higher than actual GNSS coverage of these locations. Such a discrepancy could result in costly errors for the open-pit mining operation, as described above. The CPS 200 may use ground-truth GNSS data 210 to account for some of these factors and calibrate predicted GNSS coverage determined by the CPS 200 accordingly.

For example, in some instances, the CPS 200 receives ground-truth GNSS data 210, collected or generated by a GNSS receiver 101 positioned at a location within a worksite 100, throughout a historical time period. The GNSS receiver 101 may include one or more stationary GNSS receivers and/or one or more mobile GNSS receivers. The CPS 200 can use the location of the GNSS receiver 101 and satellite ephemeris data 207 to determine predicted GNSS coverage at the location of the GNSS receiver 101 throughout the historical time period, in the same way that the CPS 200 would determine predicted GNSS coverage at an individual unit of area included a virtual matrix representing the worksite 100 throughout a future time period, as described above. The CPS 200 then compares the ground-truth GNSS data 210 collected or generated throughout the historical time period by the GNSS receiver 101 to the predicted GNSS coverage determined by the CPS 200 throughout the historical time period. For example, for each moment during the historical time period at which ground-truth GNSS data 210 was collected or generated (e.g., each one-hour increment of a twenty-four hour day in the past) by the GNSS receiver 101, the CPS 200 may compare the number of satellites determined to be visible to the GNSS receiver 101, and the DOP value of those satellites, to the number of satellites predicted to be visible to the GNSS receiver, and the DOP value of those satellites.

In some instances, after comparing the ground-truth GNSS data 210 to the predicted GNSS coverage, the CPS 200 can then determine an elevation offset 111 (e.g., an increase or decrease in the elevation of the GNSS receiver 101) that, if applied to the position of the GNSS receiver 101, would most closely align the ground-truth GNSS data 210 collected or generated by the GNSS receiver 101 throughout the historical time period with the predicted GNSS coverage determined by the CPS 200 throughout the historical time period. The CPS 200 can then calibrate predicted GNSS coverage determined for the worksite 100 throughout a future time period by applying the elevation offset 111 determined using the ground-truth GNSS data 210 and the predicted GNSS coverage from the historical time period to the predicted GNSS coverage determined for the worksite 100 throughout the future time period. An elevation offset 111 may be the entire difference between a surface level 105 and a maximum depth of a worksite 100, or an elevation offset may be any intermediate distance that most closely aligns the ground-truth GNSS data 201 collected or generated by the GNSS receiver 101 throughout the historical time period with the predicted GNSS coverage determined by the CPS 200 throughout the historical time period. An elevation offset 111 may be positive or negative. In some instances, the CPS 200 can apply the elevation offset 111 to predicted GNSS coverage using a linear interpolation, such that the elevation offset 111 is applied at the elevation at which the GNSS receiver 101 was positioned, and applied progressively more or less to elevations moving down or up respectively from the elevation at which the GNSS receiver 101 was positioned. However, an elevation offset 111 may be applied by the CPS 200 to predicted GNSS coverage in any other suitable way.

After the CPS 200 determines predicted GNSS coverage of a worksite 100 throughout a future time period (and, in some instances, after the CPS 200 calibrates the predicted GNSS coverage using ground-truth GNSS data 210, as described above), the method 300 continues with step 304, in which the CPS 200 generates a future coverage map 208 that visually depicts the predicted GNSS coverage of the worksite 100 throughout the future time period, such as by employing coverage map module 203. For example, for each increment of the future time period, the CPS 200 may generate a coverage image 401 (FIG. 4) visually depicting the predicted GNSS coverage value determined for each individual unit of area included in a virtual matrix representing the worksite 100. For example, in some instances, each individual unit of area may be given a color based on the predicted GNSS coverage value determined for the individual unit of area, e.g., green for predicted GNSS coverage values between 51 and 100, yellow for predicted GNSS coverage values between 26 and 50, and red for predicted GNSS coverage values between zero and 25. A coverage image 401 may also be generated using or otherwise include the worksite geography data 206, such that a user of the CPS 200, or a user of a software system that employs or otherwise accesses the CPS 200, may be able to gauge the predicted GNSS coverage at any location within the worksite 100 simply by looking at the coverage image 401. The CPS 200 may then compile the set of coverage maps 401 generated for each increment of the future time period to generate a future coverage map 208 that visually depicts the predicted GNSS coverage of the worksite 100 throughout the future time period. The CPS 200 may then output the future coverage map 208 and cause or prompt a graphical user interface (GUI) 110 to display the future coverage map 208. A future coverage map 208 may include a single coverage image 401 representing a single moment in time, or a plurality of coverage images 401 representing a series of moments in time.

Figure 4:
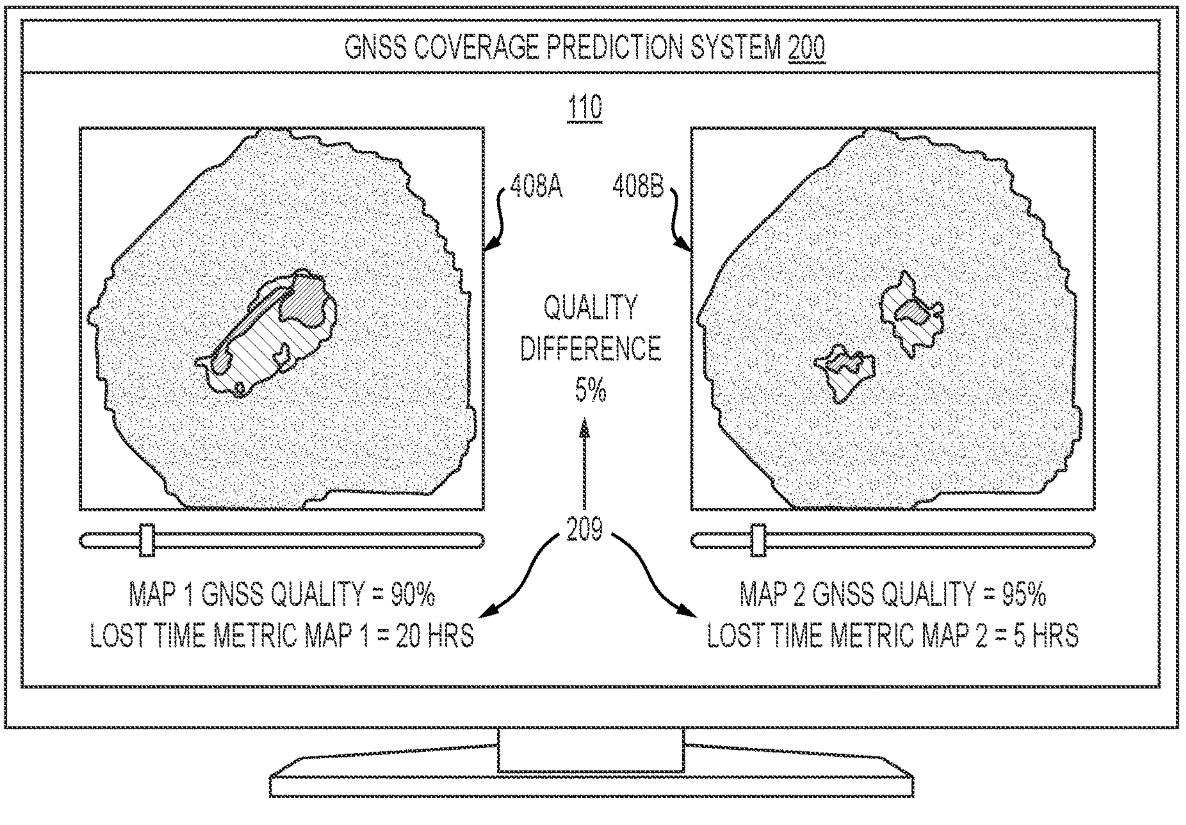
FIG. 4 illustrates a graphical user interface displaying future coverage maps and coverage analytics.

After the CPS 200 generates a future coverage map 208, the method 300 may continue or conclude with step 305, in which the CPS 200 outputs the future coverage map 208 and prompts or causes a graphical user interface (GUI) 110 to display the future coverage map 208. In some instances, the GUI 110 displays the future coverage map 208 in a moving image format showing changes in the predicted GNSS coverage of a worksite 100 throughout a future time period. For example, the GUI 110 may cycle through a series of coverage images 401 included in a future coverage map 208, such that the evolution of the predicted GNSS coverage of a worksite 100 throughout a future time period may be graphically observed. For example, FIG. 4 illustrates a GUI 110 displaying two future coverage maps 208A and 208B. In the example illustrated by FIG. 4, both of the future coverage maps 208A and 208B include 145 coverage images 401 spanning the same twenty-four hour future time period (e.g., one coverage image 401 for each ten-minute increment of the twenty-four hour future time period, plus one additional coverage image 401 representing predicted GNSS coverage at the beginning of the twenty-four hour future time period) at the same worksite 100 (e.g., the open-pit mine illustrated in FIG. 1). For both future coverage maps 208A and 208B, the GUI 110 displays a coverage image 401 representing the predicted GNSS coverage at the worksite 100 3 hours into the future time period (FIG. 4 is not necessarily drawn to scale), but for two different GNSS constellations, as described below. In this example, the GUI 110 progresses through the coverage images 401 of the two future coverage maps 208A and 208B once per second, such that a user of the CPS 200 is able to graphically observe the evolution of the predicted GNSS coverage at the worksite 100 throughout the twenty-four hour future time period. However, the GUI 110 may allow a user to fast forward or rewind through the coverage images 401, or select a particular increment during the future time period to view a corresponding coverage image 401, such as by using a scroll bar 402. In this example, the coverage images 401 display different colors representing different levels of predicted GNSS coverage, as described above, e.g., a green color 401A for predicted GNSS coverage values between 51 and 100, a yellow color 401B for predicted GNSS coverage values between 26 and 50, and a red color 401C for predicted GNSS coverage values between zero and 25.

In some instances, after generating and or causing a GUI to display one or more future coverage maps 208, the method 300 may continue with step 306, in which the CPS 200 uses the one or more future coverage maps 208 (or the data used to generate the one or more future coverage maps 208) to generate coverage analytics 209 regarding the predicted GNSS coverage of a worksite 100, such as by employing the analytics module 205. In some instances, a coverage analytic 209 is a GNSS quality difference. For example, FIG. 4 illustrates two different future coverage maps 208A and 208B generated for the same worksite 100, e.g., the open-pit mine illustrated in FIG. 1. However, the CPS 200 generated the first future coverage map 208A using satellite ephemeris data 207 associated with a first set of GNSS constellations (e.g., GNSS constellations 102A and 102B) and the second future coverage map 208B using satellite ephemeris data 207 associated with a second set of GNSS constellations (e.g., GNSS constellations 102B and 102C), which may include a different number or combination of GNSS constellations. Accordingly, as illustrated in FIG. 4, the future coverage maps 208A and 208B are different. In this example, the CPS 200 can determine or calculate a first total GNSS coverage quality of the first future coverage map 208A and a second total GNSS coverage quality of the second future coverage map 208B. For example, a total GNSS coverage quality of a future coverage map 208 could be calculated as a percent of time that a threshold percent of units of area included in the future coverage map 208 have a predicted GNSS coverage value above a threshold predicted GNSS coverage value. However, the CPS 200 may calculate a total GNSS coverage quality of a future coverage map 208 in any other suitable way. The CPS 200 can then compare the first total GNSS coverage quality and the second total GNSS coverage quality to generate a GNSS quality difference. The CPS 200 can then cause the GUI 110 to display the GNSS quality difference, as illustrated in FIG. 4. In the example illustrated in FIG. 4, the first total GNSS coverage quality is 90%, and the second total GNSS coverage quality is 95%, implying that the second set of GNSS constellations produces a 5% better predicted GNSS coverage for the worksite 100 throughout future time period than the first set of GNSS constellations. With this knowledge, an operator of the open-pit mine may decide to upgrade their equipment to leverage the second set of GNSS constellation instead of the first set of GNSS constellations, for example.

In some instances, a coverage analytic 209 is a lost time metric. For example, in some instances, the CPS 200 may receive operational plan data describing one or more routes planned for one or more autonomous or semi-autonomous machines 107 to be used at a worksite 100 throughout a future time period. The CPS 200 can then cross-reference the operational plan data with a future coverage map 208 generated for the worksite 100 throughout the future time period to identify moments and/or locations at which the predicted GNSS coverage of the worksite 100 will be too poor for the one or more autonomous or semi-autonomous machines 107 to operate. The CPS 200 can then calculate a total amount of time in which the one or more autonomous or semi-autonomous machines 107 will not be able to operate due to the predicted GNSS coverage of the worksite 100 to generate a lost time metric. The CPS 200 can then cause the GUI 110 to display the lost time metric, as illustrated in FIG. 4. In the example illustrated in FIG. 4, the CPS 200 has received operational plan data and calculated a lost time metric for both future coverage maps 208A and 208B. The lost time metric calculated for the first future coverage map 208A is 20 hours, and the lost time metric calculated for the second coverage map 208B is five hours, implying that, throughout the future time period represented by the first and second future coverage maps 208A and 208B, the first set of GNSS constellations would cause the one or more autonomous or semi-autonomous machines 107 included in the operational plan data to be inoperable for 15 hours more than the second set of GNSS constellations would.

A future coverage map 208 (e.g., future coverage map 208A or 208B) generated by the CPS 200 for a worksite 100 can be used in various ways. For example, a future coverage map 208 may be used to determine the most efficient times and locations for autonomous or semi-autonomous machines 107 that depend on GNSSs for navigation to be operated within a worksite 100. Or for example, a future coverage map 208 may be used to determine times and locations at which an autonomous or semi-autonomous machine 107 should not be operated within a worksite 100, so that the machine 107 will not be put at risk of being rendered inoperable or colliding with another machine 107. Or for example, a future coverage map 208 may be used to determine if a different set of GNSS constellations should be used by an operation, e.g., if the operation should use a different or additional GNSS constellation to improve the predicted GNSS coverage of a worksite 100 throughout a future time period, or if other measures should be taken, such as employing a ground-based positioning augmentation system, e.g., ground-based pseudolites. Additionally, a future coverage map 208 generated by the CPS 200 and calibrated using ground-truth GNSS data 210 can provide worksite decision-makers with highly accurate predicted GNSS coverage, allowing the worksite decision-makers to account for lapses in GNSS coverage that they would not otherwise be aware of.

While the present disclosure often describes a coverage prediction system (CPS) 200 capable of generating future coverage maps 208 representing the predicted GNSS coverage of a worksite 100 throughout a future time period, it should be understood that a CPS 200 may alternatively or additionally be capable of generating a past coverage map representing the predicted GNSS coverage of a worksite 100 throughout a historical time period. For example, as described above, in some instances, when generating an elevation offset 111, the CPS 200 uses a location of the GNSS receiver 101 and satellite ephemeris data 207 to determine predicted GNSS coverage at the location of the GNSS receiver 101 throughout a historical time period. Similarly, in some instances, to generate a past coverage map, the CPS 200 can use satellite ephemeris data 207 to determine predicted GNSS coverage at a collection of locations (e.g., a virtual matrix, as described above) representing a worksite 100 throughout a historical time period. The CPS 200 can then use the predicted GNSS coverage at the collection of locations representing the worksite 100 throughout the historical time period to generate and output a past coverage map for the worksite 100, much in the same way that the CPS 200 can use predicted GNSS coverage throughout a future time period to generate a future coverage map 208, as described above. Similarly, the CPS 200 may generate and output a coverage map representing any past, present, or future time period.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method for providing a global navigation satellite system (GNSS) future coverage map, the method comprising:

receiving worksite geography data associated with a worksite and satellite ephemeris data associated with a future time period;

determining, based at least in part on the worksite geography data and the satellite ephemeris data associated with the future time period, GNSS coverage of the worksite throughout the future time period;

determining an elevation offset associated with the worksite;

adjusting the determined GNSS coverage of the worksite throughout the future time period by applying the determined elevation offset to the determined GNSS coverage;

generating elevation-adjusted GNSS coverage of the worksite throughout the future time period based on the application of the determined elevation offset to the determined GNSS coverage;

generating a future coverage map representing the elevation-adjusted GNSS coverage of the worksite throughout the future time period; and causing a graphical user interface (GUI) to display the future coverage map.

2. The method of claim 1, wherein the future time period includes a total duration of one day or less.

3. The method of claim 1, wherein the future time period includes a total duration of one week or more.

4. The method of claim 1, further comprising causing the GUI to display the future coverage map in a moving image format showing changes in the GNSS coverage of the worksite throughout the future time period.

5. The method of claim 1, further comprising causing the GUI to display the future coverage map with different colors representing different levels of GNSS signal quality.

6. The method of claim 1, further comprising:

generating a first version of the future coverage map based on a first set of GNSS constellations;

generating a second version of the future coverage map based on a second set of GNSS constellations; and causing the GUI to display both the first and second versions of the future coverage map.

7. The method of claim 1, further comprising:

generating a first version of the future coverage map based on a first set of GNSS constellations;

generating a second version of the future coverage map based on a second set of GNSS constellations; and determining a quality difference between a first total GNSS quality of the first version of the future coverage map throughout the future time period and a second total GNSS quality of the second version of the future coverage map throughout the future time period; and causing the GUI to display the quality difference between the first total GNSS quality and the second total GNSS quality.

8. The method of claim 1, further comprising generating a coverage analytic based at least in part on the future coverage map and causing the GUI to display the coverage analytic.

9. The method of claim 1, wherein determining the elevation offset comprises:

receiving satellite ephemeris data associated with a historical time period;

determining, based at least in part on the worksite geography data and the satellite ephemeris data associated with the historical time period, GNSS coverage of the worksite throughout the historical time period;

receiving ground-truth GNSS data associated with the worksite, wherein the ground truth GNSS data corresponds to the historical time period; and comparing the GNSS coverage of the worksite throughout the historical time period to the ground-truth GNSS data.

10. The method of claim 9, wherein the ground-truth GNSS data is generated by a stationary receiver located within the worksite.

11. The method of claim 9, wherein the ground-truth GNSS data is generated by a mobile machine located within the worksite.

12. The method of claim 1, further comprising:

receiving operational plan data associated with the worksite; and generating, using the future coverage map and the operational plan data, a lost time metric associated with the operational plan.

13. The method of claim 1, wherein the worksite geography data includes a three-dimensional model of the worksite.

14. The method of claim 1, wherein the worksite geography data includes point cloud data representing the worksite.

15. The method of claim 1, further comprising:

generating a first version of the future coverage map based on a first set of GNSS constellations;

generating a second version of the future coverage map based on a second set of GNSS constellations; and causing the GUI to simultaneously display both the first and second versions of the future coverage map.

16. A method for providing a global navigation satellite system (GNSS) future coverage map, the method comprising:

receiving worksite geography data associated with a worksite and satellite ephemeris data associated with a future time period;

determining, based at least in part on the worksite geography data and the satellite ephemeris data associated with the future time period, GNSS coverage of the worksite throughout the future time period;

receiving satellite ephemeris data associated with a historical time period;

determining, based at least in part on ground-truth GNSS data associated with the worksite and the satellite ephemeris data associated with the historical time period, an elevation offset associated with the worksite;

generating, based at least in part on the GNSS coverage of the worksite throughout the future time period and the elevation offset associated with the worksite, a future coverage map representing the GNSS coverage of the worksite throughout the future time period; and causing a graphical user interface (GUI) to display the future coverage map.

17. The method of claim 16, wherein determining the elevation offset associated with the worksite further comprises:

determining, based at least in part on the worksite geography data and the satellite ephemeris data associated with the historical time period, GNSS coverage of the worksite throughout the historical time period;

receiving the ground-truth GNSS data, wherein the ground truth GNSS data corresponds to the historical time period; and comparing the GNSS coverage of the worksite throughout the historical time period to the ground-truth GNSS data.

18. The method of claim 16, further comprising:

generating a first version of the future coverage map based on a first set of GNSS constellations;

generating a second version of the future coverage map based on a second set of GNSS constellations; and determining a quality difference between a first total GNSS quality of the first version of the future coverage map throughout the future time period and a second total GNSS quality of the second version of the future coverage map throughout the future time period; and causing the GUI to display the quality difference between the first total GNSS quality and the second total GNSS quality.

19. The method of claim 16, wherein the ground-truth GNSS data is generated by a stationary receiver located within the worksite.

20. A system for providing a global navigation satellite system (GNSS) future coverage map, the system comprising at least one processor operative to:

receive worksite geography data associated with a worksite and satellite ephemeris data associated with a future time period;

determine, based at least in part on the worksite geography data and the satellite ephemeris data associated with the future time period, GNSS coverage of the worksite throughout the future time period;

determine an elevation offset associated with the worksite;

adjust the determined GNSS coverage of the worksite throughout the future time period by applying the determined elevation offset to the determined GNSS coverage;

generate elevation-adjusted GNSS coverage of the worksite throughout the future time period based on the application of the determined elevation offset to the determined GNSS coverage;

generate a future coverage map representing the GNSS coverage of the worksite throughout the future time period; and cause a graphical user interface (GUI) to display the future coverage map.

* * * * *